United States Patent [19]

Retsch et al.

[11] Patent Number: 4,550,900
[45] Date of Patent: Nov. 5, 1985

[54] HOLDING DEVICE FOR SEGMENTING A WORKPIECE

[75] Inventors: William H. Retsch, Castle Shannon; Stanley F. Zdziarski, Glenshaw, both of Pa.

[73] Assignee: PPG Industries, Inc., Pittsburgh, Pa.

[21] Appl. No.: 575,428

[22] Filed: Jan. 31, 1984

Related U.S. Application Data

[63] Continuation-in-part of Ser. No. 426,532, Sep. 29, 1982, abandoned.

[51] Int. Cl.⁴ ............................................. B25B 1/00
[52] U.S. Cl. ................................. 269/87; 269/243; 269/288
[58] Field of Search .................. 269/288, 87–87.2, 269/1, 2, 243; 83/761–767, 455, 466.1, 565; 248/466, 475 R; 24/263 A

[56] References Cited

U.S. PATENT DOCUMENTS

| | | |
|---|---|---|
| 1,900,314 | 3/1933 | Strom . |
| 2,003,619 | 6/1935 | Williamson . |
| 2,387,154 | 10/1945 | Kalwitz . |
| 2,553,631 | 5/1951 | Christenson ............................ 269/2 |
| 2,598,117 | 5/1952 | Ethridge . |
| 2,686,890 | 8/1954 | Davis . |
| 2,918,099 | 12/1959 | Goldstein . |
| 3,132,678 | 5/1964 | Steketee . |
| 3,347,296 | 10/1967 | Rothman . |
| 4,060,333 | 11/1977 | White . |

FOREIGN PATENT DOCUMENTS 393197 6/1933 United Kingdom .

Primary Examiner—Robert C. Watson
Attorney, Agent, or Firm—Kenneth J. Stachel

[57] ABSTRACT

Radial cutting of a flat workpiece having any shape can be accomplished in a facile manner with the provided holding device. The holding device has two holding blocks and an attachment means to attach the holding blocks in matched configuration. Each holding block on its inner face has a depression which begins at a peripheral surface of each holding block and extends to the interior of the holding block but not to the outer face of the holding block. The depression has a shape comparable to a workpiece so that when the holding blocks are attached to hold a workpiece in the depressions, the two depressions form a cavity to contain the workpiece with pressure to securely hold a vertical portion of the volume of the workpiece. Each depression holds a horizontal portion of the volume of the workpiece and the remaining horizontal portion of the volume of the workpiece not contained in the depression of the first holding block can be contained in the depression of the second holding block. Radial cutting is performed by guiding a cutting device along the peripheral edge of the holding device, where the cavity opening is located and from which there is protruding at least one-half of the vertical portion of the volume of the workpiece. Less than one-half of the vertical portion of the volume of the workpiece can protrude from a cavity, which is formed by the matched depressions of the first and second holding blocks, into opening that start at two different peripheral surfaces of each holding block and are formed by intersecting sides.

8 Claims, 2 Drawing Figures

HOLDING DEVICE FOR SEGMENTING A WORKPIECE

REFERENCE TO RELATED APPLICATION

This patent application is a continuation-in-part of patent application Ser. No. 426,532, filed Sept. 29, 1982, now abandoned.

BACKGROUND OF THE INVENTION

This invention relates to a device for holding a workpiece, particularly a cylindrical workpiece, to permit radial cutting of the workpiece into two or more segments.

In cutting a workpiece into segments with a manual or power saw, it is imperative that something hold the device during the cutting. In cutting small workpieces or objects with a power saw, the holding device can be some type of clamp or holding tool. In cutting small flat objects with circular sides such as cylinders into two or more segments with a manual or power saw, the objects may tend to spin or slip as the blade first contacts the curved surface of the workpiece. Such movement could not be tolerated in the precision cutting of objects for industrial application. Also, such cutting could be laborious and time-consuming if performed without any cutting guides.

In the production of glass fibers objects with arcuate surfaces are used to gather the fibers into one or more strands. The glass fibers are commonly attenuated from molten glass through orifices in a bushing. The number of these orifices can range from about 200 to 4,000 or even more. These individual filaments are coated with a lubricant binder and/or sizing composition. The treated filaments are gathered into one or more unified strands by a gathering shoe. Also a number of gathering shoes can be used to collect a number of fibers into several unified strands. Such shoes are conventionally formed of materials such as graphite, tetrafluorethylene and the like. The gathering shoes have generally flat top and bottom sections with circular sides has a channel in which the glass fibers contact the shoe and to form the unified strand. In the production of the glass fibers as the fibers contact the shoe, the gathering shoe can be stationary or it can rotate. When the fibers contact the gathering shoe and are collected into one or more strands, the fibers and strand only occupy a portion of the peripheral channel in the circular shoe. Therefore, when the gathering shoe or shoes are stationary, a segment of the circular gathering shoe can be used. Traditionally, the segment that is used is a quarter segment but any other fractional segment of a shoe that would be effective in gathering the fibers into one or more strands can be used.

In the past, segments of circular gathering shoes have been cut by hand on a power saw. The precision of such cutting is variable due to the manual cutting method so the cut segments are not uniform in size. This nonuniformity may arise because the saw in first contacting the curved surface of the circular shoe may have a tendency to slip because the shoe is not held firmly enough during this contact. Any large nonuniform quarter segments can be ground to the desired size but the small nonuniform segments are generally discarded.

By means of the present invention, the radial cutting of a workpiece and particularly a flat, circular workpiece with a generally cylindrical shape such as a gathering shoe, can be performed in less time and with improved precision and uniformity of the cut segments to reduce material waste.

SUMMARY OF THE INVENTION

Briefly, the present invention in its broadest aspects comprises a holding device for a workpiece to be radially cut into two or more segments. The holding device has two holding blocks and an attachment means to hold the two blocks together in a matched configuration. Each holding block has an opposed inner and outer face connected by sides. Each inner face has a depression at the periphery of at least one side of the inner face. The depression is formed by at least one portion of one side connecting the inner and outer faces having a shorter length than the opposing side of the block. The shorter length continues for a distance into the block toward the center of the block to give the inner face two substantially parallel surfaces at different distances from the outer face. The one surface extends into the block from the portion of the side having a shorter length forming a surface which is substantially parallel to the outer face. This surface constitutes either the top or bottom of the depression, depending on whether the holding block is the top or bottom block. The other surface constitutes the inner face, which is substantially parallel to the outer face, extending from the sides of the block having the longer lengths. The connecting sides between the two surfaces of the inner face constitute the sides of the depression. The depression extends a distance horizontally into the inner face so that the depression can contain a fraction of a vertical portion of the volume of a workpiece placed in the depression. Also the depression extends a distance vertically into the inner face so that the depression can contain a fraction of a horizontal portion of the volume of a workpiece placed in the depression.

When the holding blocks are attached in matched configuration by the attachment means, the depressions of the first and second holding blocks form a cavity. The cavity of the attached holding blocks contains in a pressure contacting manner a fraction of the vertical portion of the volume of the workpiece. This fractional vertical portion includes the entire horizontal portion of the volume of the workpiece that is contained in the fraction of the vertical portion of the volume contained by each depression in both holding blocks. The cavity starting from at least one peripheral side of the attached holding blocks allows the uncontained vertical portion of the volume of the workpiece to extend out from the holding blocks. This extending portion of the workpiece can be easily cut in a radial fashion with a cutting device by following the side or sides of the attached holding blocks from which the portion of the workpiece extends. Such radial cutting using the applicable sides of the holding device as cutting guides will produce two segments of the workpiece radially cut through the diameter of the workpiece.

A specific aspect of the present invention entails the depression of each inner face of each holding block having an arcuate periphery in the inner faces of the holding blocks so that the depressions can hold a horizontal portion of the volume of a flat circular or generally cylindrical workpiece. In the specific aspect, the depressions also begin from intersecting sides of the holding blocks, where the intersecting sides form an opening in the holding blocks. The opening extends vertically from the inner face to the outer face of each holding block. The opening is wedge-shaped with the distal end of the wedge with the converging sides extending into the holding block. In the specific aspect of the present invention, radial cutting is performed by guiding a cutting device along one intersecting side of the holding block through the circular workpiece to the center of the circular workpiece and withdrawing the cutting device. The cutting device is placed on the other intersecting side of the holding blocks and the cutting device is guided through the circular workpiece to the center of the circular workpiece. This radial cutting cuts a wedge-shaped segment from the circular workpiece, where the end of the wedge with diverging sides has an arcuate surface with an arc from around 5 degrees to 180 degrees. This arc is comparable to the angle formed by the intersecting sides of the attached holding blocks.

In addition, in the specific aspect of the present invention, the intersecting sides of the holding blocks can extend further in a straight line into each holding block so that the extensions form two diverging channels in each holding block. The channels extend from the inner face to the outer face of each holding block so that when the holding blocks are in matched configuration, the channels of each holding block are matched. The channels extend into the holding block a distance equal to the distance of the intersecting side from the periphery of the holding block to the point of convergence of the intersecting sides. This distance of the channel in addition to the distance of the intersecting side from which the channel extends provides a distance that is sufficient to permit the cutting of a workpiece from one end to its opposite end. The channels start from the point of convergence of the intersecting sides which can be at the center of the circular workpiece.

DESCRIPTION OF THE PREFERRED EMBODIMENT

In the description of the present invention, the following terms have the following meanings.

The term "vertical portion of the volume" refers to that portion of the volume of a workpiece, where the shape of the workpiece may be any shape having a flat top and bottom and the height or thickness of the workpiece at its full height or thickness. The length or width, or radius or base, respectively, for shapes such as rectangular blocks, cylinders, and flat pentahedrone are a fraction, preferably one-half of their full value for the workpiece.

The term "horizontal portion of the volume" refers to that portion of the volume of a workpiece, where the shape of the workpiece may be any shape having a flat top and bottom and the height or thickness of the workpiece is a fraction, preferably one-half of its full height or thickness. The length or width or radius or base, respectively, for shapes such as rectangular blocks, cylinders and flat topped and bottomed pentahedrons are their full values for the workpiece.

Figure 2:
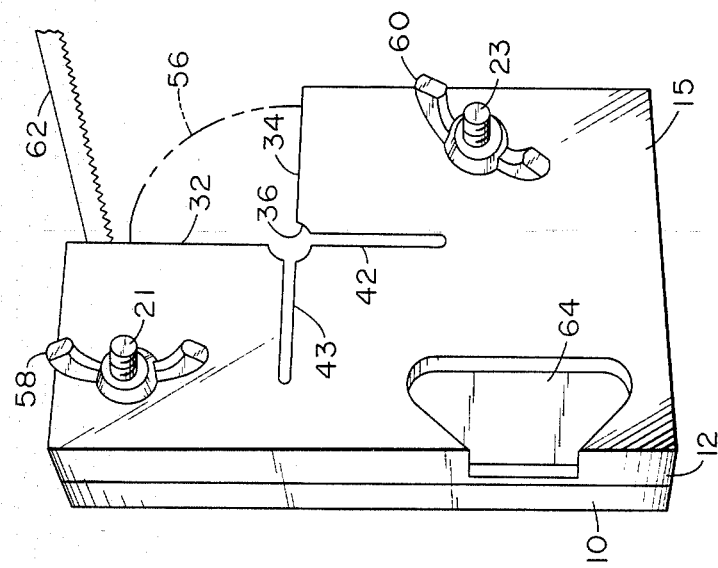
FIG. 2 is a plane view of the top and sides of the attached holding blocks to form the holding device containing a circular workpiece that is being radially cut.
Figure 1:
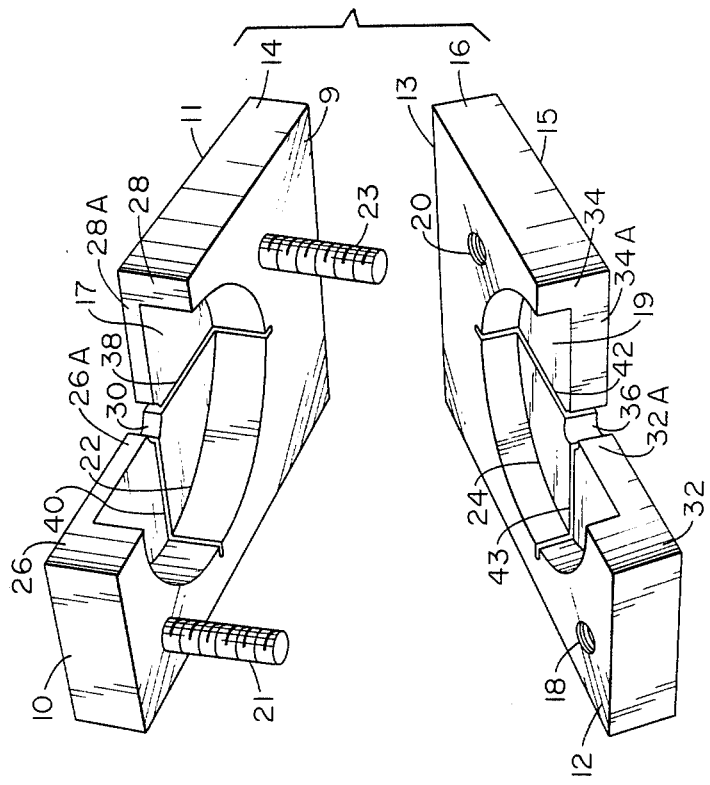
FIG. 1 is an unexploded side view of the holding device of the present invention showing the unattached holding blocks.

Referring first to FIG. 1 and then FIG. 2, where like reference numbers refer to like parts throughout, one preferred embodiment of the present invention is shown in FIGS. 1 and 2.

FIG. 1 illustrates the exploded side view of an unattached holding device of the present invention having a first flat holding block 10 and a second flat holding block 12. The holding blocks can be made from materials such as metals, wood or plastic or any other material which would be adaptable for having a depression cut into the material, but at the same time would allow for continued uniform straight cuts to be made adjacent to one or more sides of the holding block. Holding block 10 has an inner surface 9 and an outer surface 11 connected by outer sides 14 around the periphery of the block 10. Holding block 12 has an inner face 13 and an outer face 15, more cleary visible in FIG. 2, connected by outer sides 16 around the periphery of the block 12.

Holding blocks 10 and 12 are held together so that interface 9 and interface 13 contact each other by any suitable attachment means. Fasteners 21 and 23 extending from the inner face 9 of holding block 10 can be inserted into suitable receptacles 18 and 20 on inner face 12. This type of attachment means would allow for extension of fasteners 21 and 23 through receptacles 18 and 20 to the outer base of holding block 12, where these fasteners can be securely held by any suitable means such as wing nuts and the like. Although a particular type of attachment means has been described, the attachment means can be any suitable fastening arrangement that preferably allows the inner face of holding block 10 to contact the inner face of holding block 12 either directly or indirectly. By indirectly, it is meant that the inner face of one holding block and the inner face of the other holding block are separated and where the horizontal area 17 of the depression of holding block 10 contacts with pressure one flat end of the workpiece, while the horizontal area 19 of the depression of the holding block 12 contacts the pressure the other flat end of the workpiece. In addition, the attachment means could be a hinge located at one end of holding blocks 10 and 12 so that the holding blocks open at one end but are attached at the hinged end of the holding device. For this hinge attachment means, a suitable fastener would be located at any of the other ends of the holding blocks.

Holding block 10 has a generally rectangular shape with a wedge-shaped opening 30 at one corner of the rectangle. Although the holding block has a rectangular shape, any shape can be used such as triangular or circular, where the opening would be at one or more outermost sides and peripheral surfaces of the triangular or circular shaped holding block. The opening 30 is formed in holding block 10 by intersecting sides 26 and 28. In FIG. 1, intersecting sides 26 and 28 are at right angles to each other and are at right angles from the outer most sides 14 and peripheral surfaces of the rectangle from which they begin. The intersecting sides 26 and 28 can have any angular relationship from about 5° to 180° to allow for various wedge-shaped openings. Preferably, intersecting sides 26 and 28 form a right angle.

The inner face 9 of holding block 10 has depression 22 which starts at opening 30 from a portion of each intersecting side 26 and 28. Each intersecting side 26 and 28 has a portion 26A and 28A that have shorter lengths than sides 26 and 28. The depression extends from the shorter length side portion into the block but does not reach the outer face of holding block 10. The depression terminates at surface 17 before reaching the outer face 11 and surface 17 is parallel to the outer face 11. Also, the depression does not extend too far into the block from the shorter length portions 26A and 28A so as to reach the outer sides 14 of holding block 10. The parallel surface 17 which is preferably a horizontal surface, is the second surface of inner face 9. The second surface 17 is substantially parallel to the inner face 9. The parallel surface 17 forms one of the two opposing sides of depression 22, where the other opposing side is open. It is preferred that the depression have an arcuate side surface formed by the different distances from the outer face 11 of the inner face 9 and the flat horizontal surface 17. The depression has a depth sufficient to contain a horizontal portion and preferably a horizontal portion of one-half of the volume of the workpiece. Also the first holding block 10 has channels 40 and 38 which extend in a straight line fashion from intersecting sides 28 and 39 respectively. These channels are straight line extensions from the respective intersecting sides through the depression in the innerface.

Second holding block 12 can be any shape as holding block 10 but is always the same shape as that of holding block 10 so that, when the holding blocks are attached, they form a matched configuration. Holding block 12 has an opening 36, which is a wedge-shaped opening at the corner of the rectangular holding block 12. This wedge-shaped opening is identical to the wedge-shaped opening 30 of holding block 10 so that, when the two holding blocks are attached, the openings match. This opening can also vary as the opening of holding block 10 varies in degrees. The opening is formed in holding block 12 by intersecting sides 32 and 34 where each extends at right angles from one of the outer sides 16 of the holding block into the holding block from the inner face to the outer face of the holding block.

As with holding block 10, the inner face 13 of holding block 12 has a depression, 24, which starts at opening 30, from a portion of each intersecting side 32 and 34. Each intersecting side 32 and 34 has a portion 32A and 34A that have shorter lengths than sides 32 and 34. The depression 24 extends from the shorter length side portions 32A and 34A into block 12. The depression does not extend too far into the block to reach the outer face of holding block 12. The depression terminates at surface 19 before reaching the outer face, and surface 19 is substantially parallel to the outer face 15. Also, the depression does not extend too far into the block from the shorter length portions 26A and 28A so as to reach the outer sides 16 of holding block 12. The parallel surface 19, which is preferably a horizontal surface, is the second surface of the inner face 13. This second surface is substantially parallel to inner face 13. The parallel surface, 19, forms one of two opposing sides of depression 24, where the other opposing side is open, so that when depressions 22 and 24 are in matched configuration, they form a cavity.

In using the terms "substantially parallel for the inner faces", it is means that slight degress of slope can be tolerated between the inner face and outer face. It is to be understood that when one substantially parallel inner face surface slopes in one direction, the matching, substantially parallel inner face surface on the opposing block will slope in the other direction at the same degree of slope. This allows the two holding blocks to be placed in match configuration so that the depressions of the two blocks meet to form the cavity.

The depression 24 extends a distance into the holding block so as to hold a horizontal portion of the volume of a circular workpiece. This depression 24 has a circular side and a flat bottom identical to depression 22 in holding block 1. Although when the attachment means is a hinge arrangement, the depression 22 of the holding block 10 can be larger than depression 24 of holding block 12 so that holding blocks 10 and 12 can be closed to contain the workpiece by pressure engagement. This depression has a depth sufficient to contain the remaining horizontal portion of the volume not contained by depression 22 of the first holding block and preferably contains the other half horizontal portion of the volume. When the holding blocks are attached in matched configuration, the depressions of holding blocks 10 and 12 also match so as to place pressure on a circular workpiece to securely hold the workpiece in the two depressions which form the cavity. If the circular workpiece is thicker than the height of the cavity formed by the two depressions of the first and second holding blocks, a gap may exist between the inner faces of the attached holding blocks. In addition, holding block 12 has channels 43 and 42 extending from intersecting sides, 34 and 32 respectively. The channels extend in straight line configuration from the respective intersecting side and extend from the inner face to the outer face of the second holding block.

FIG. 2 illustrates the holding device of the present invention having the first and second holding blocks attached and containing a circular workpiece which extends into the openings 36 and 30 for radial cutting. FIG. 2 illustrates the holding blocks of FIG. 1 that are attached and rotated 90 degrees so that the plane of the attached holding blocks is the same as the plane of the paper of FIG. 2. The first and second holding blocks 10 and 12 respectively, are attached by wing nuts 58 and 60 securely fastening fasteners 21 and 23 which extend through receptacle 18 and 20. The circular workpiece 56 is placed between the first and second holding blocks before the first and second holding blocks are attached tgether to have contact between the inner faces of the first and second holding blocks. The circular workpiece 56 as seen in opening 36 in FIG. 2 is only a quarter segment of the circular workpiece which is extending into opening 36. Although not in view in FIG. 2, the flat circular, generally cylindrical workpiece 56 also extends into the matched opening 30 of holding block 10. The other three quarter segment of the circular workpiece is in the cavity formed by the two depressions in the first and second holding blocks. With this matched configuration of the first and second holding blocks containing the circular workpiece, a saw blade such as 62 either from a manual or motorized saw can be guided along intersecting side 32 and into channel 42. Even with these two radial cuts, which make a diameter cut, the holding device of the present invention firmly contains and holds the two pieces of the cut circular workpiece. The holding device of the present invention can then be rotated 90° and the saw blade 62 guided along intersecting side 34 and into channel 43. Such radial cutting segments the circular workpiece into quarters. Each quarter is a wedge-shaped quarter having a curved surface distal to the point of intersection of the sloping sides.

The quartered segments or any fractional segment of the circular workpiece can be placed in recessed area 64 on the outer face of either the first or second holding block. FIG. 2 shows the recessed area 64 to be on the outer surface of the second holding block. The recess in the outer face of the holding block is a wedge-shaped recess with the inner face of the recess having a surface addition to the two contact points provided by the converging sides of the wedge-shaped recess in order to accommodate the wedge-shaped segment. A portion of the wedge-shaped segment will protrude from the recessed area which is adjacent a peripheral edge of the outer face of the holding block. The saw can then be guided along the outer edge of the holding blocks and the segmented piece will be trimmed to remove the apex portion of the wedge-shape. Such trimming will enable a quartered segment to be placed in a holding device so that the quartered segment can be used as a stationary gathering shoe for gathering glass fibers into glass fiber strand.

Although the workpiece described in detail in the figures has been a circular workpiece, it should be understood that any shaped workpiece can be fitted into the cavity formed by the two depressions 22 and 24 in FIG. 1 where the cavity has the same shape as the workpiece. Thus, any shaped workpiece can be contained in the cavity of the attached first and second holding blocks and radially cut by guiding a cutting device along the combined intersecting sides of 26 and 32 and 28 and 34. The angle between these intersecting sides can vary in the attached holding blocks from around 5 degrees to 180 degrees. By this procedure, where the cavity holds at least half and preferably three quarters of the vertical portion of the volume of the workpiece, the half or less portion and preferably a one quarter vertical portion of the volume extending from the cavity is cut by a manual or power saw moving along the intersecting sides. It is preferred that the cutting device used to radially cut the portion of the workpiece extending from the cavity is a power band saw. The shape of the workpiece could be rectangular, square, diamond-shape, pentahedron or any other appropriate shape having a flat top and bottom which is to be radially cut.

While the invention has been disclosed with reference to certain specific embodiments, the various details set forth in the above description of the invention are not to be considered as limitations upon the scope of the invention except insofar as set forth in the accompanying claims.

We claim:

1. A device for holding a workpiece to permit radial cutting of the workpiece into two or more segments, comprising:
   a. a first block with an inner and outer face and peripheral sides and wedge-shaped opening extending from the inner face to the outer face and formed by intersecting sides extending into the block from two contiguous peripheral sides of the block,
   b. a depression in the inner face of the first block beginning on each intersecting side that forms the wedge-shaped opening of the first block at a point on said intersecting sides equidistant from the contiguous peripheral sides of the block and extending laterally into the center of the first block where said depression has peripheral side walls, and where said depression begins on the inner face and extends into the block a distance to form a surface substantially parallel to the inner face, and where the intersecting sides forming the wedge-shaped opening extend to the center of the depression,
   c. a second block with an inner and outer face and peripheral sides and wedge-shaped opening similar to that of the first block extending from the inner face to the outer face formed by intersecting sides extending into the block from two contiguous peripheral sides of the second block,
   d. a depression in the inner face of the second block similar to that of the first block beginning on each intersecting side that forms the wedge-shaped opening of the second block at a point on said intersecting sides equidistant from the contiguous peripheral sides of the second block and extending laterally into the center of the second block where said depression has one or more peripheral side walls, and where said depression begins on the interface and extends into the block a distance to form a surface parallel to the inner face and where the intersecting sides forming the wedge-shaped opening extend to the center of the depression,
   e. an attachment means to attach the first block to the second block so that the wedge-shaped openings match and the depressions of each block match to form a cavity, whereby an uncontained portion of a workpiece can protrude into the matched, wedge-shaped openings of the first and second blocks from the cavity to allow for two straight radial cuts to be made through the workpiece by guiding a cutting device along the intersecting sides of the attached holding blocks that form the opening.

2. The article of claim 1, wherein each block has two channels extending in a straight line manner from each intersecting side from the inner face to the outer face of each holding block and to the peripheral surface of each depression.

3. Article of claim 1, wherein the sidewalls of the depression of each block have an arcuate peripheral side to contain a cylindrical workpiece.

4. Article of claim 1, wherein the intersecting sides of each block form a right angle to form an opening in the first and second blocks which is wedge-shaped.

5. Apparatus of claim 1, wherein the attachment means comprises fastening members projecting from the inner surface of one block capable of extending through matching receptacles in the other block to pass through to the outer surface of the other block and securing members are attached to the fastening members to secure attachment between first and second holding blocks.

6. Apparatus of claim 1, wherein the outer face of one block has a recessed area having a wedge-shape similar to a portion of the wedge-shaped opening of the blocks, but where the sloping sides of the wedge-shape terminate at the peripheral edge of the block without intersection.

7. Article of claim 1, wherein the depressions of each holding block form a cavity sufficient to contain a workpiece without the contacting of the inner faces of each holding block.

8. Article of claim 1, wherein the first block is attached to the second block so that the inner face of the block meet each other and the cavity formed by the depressions of each holding block are sufficient to contain a portion of the workpiece not extending into the wedge-shaped opening for cutting.

* * * * *